United States Patent
Das Sharma

(10) Patent No.: US 7,730,376 B2
(45) Date of Patent: Jun. 1, 2010

(54) PROVIDING HIGH AVAILABILITY IN A PCI-EXPRESS™ LINK IN THE PRESENCE OF LANE FAULTS

(75) Inventor: Debendra Das Sharma, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 83 days.

(21) Appl. No.: 12/056,777

(22) Filed: Mar. 27, 2008

(65) Prior Publication Data

US 2008/0178052 A1 Jul. 24, 2008

Related U.S. Application Data

(63) Continuation of application No. 11/165,817, filed on Jun. 24, 2005, now Pat. No. 7,353,443.

(51) Int. Cl.
*G01R 31/28* (2006.01)
*G06F 11/00* (2006.01)

(52) U.S. Cl. .................... 714/742; 714/712

(58) Field of Classification Search ............ 714/712, 714/724, 742
See application file for complete search history.

(56) References Cited

U.S. PATENT DOCUMENTS

| 5,375,225 | A | 12/1994 | Dean et al. |
| 6,009,488 | A | 12/1999 | Kavipurapu |
| 6,108,113 | A * | 8/2000 | Fee ............................. 398/16 |
| 7,124,334 | B2 * | 10/2006 | Kashiwakura ............... 714/712 |
| 7,206,981 | B2 * | 4/2007 | Schoenborn et al. ......... 714/724 |
| 7,231,560 | B2 | 6/2007 | Lai et al. |
| 7,412,642 | B2 * | 8/2008 | Cypher ....................... 714/776 |
| 2005/0270988 | A1 | 12/2005 | DeHaemer |
| 2006/0129733 | A1 | 6/2006 | Sobelman |

* cited by examiner

*Primary Examiner*—James C Kerveros
(74) *Attorney, Agent, or Firm*—Derek J. Reynolds

(57) ABSTRACT

A method, device, and system are disclosed. In one embodiment, the method comprises discovering a failure on a PCI Express interconnect, determining whether a failure override bit has been set to override the standard PCI Express Polling.Compliance state for the failure on the PCI Express interconnect, and if the failure override bit has been set, entering PCI Express Polling.Configuration state if any one lane of the interconnect successfully completes the transmitting and receiving training sequence requirements in PCI Express Polling.Active state.

19 Claims, 5 Drawing Sheets

PROVIDING HIGH AVAILABILITY IN A PCI-EXPRESS™ LINK IN THE PRESENCE OF LANE FAULTS

CROSS-REFERENCE TO RELATED APPLICATIONS

This application is a continuation of U.S. Pat. No. 7,353,443, Ser. No. 11/165,817, filed on Jun. 24, 2005, the entire disclosure of which is incorporated herein by reference.

FIELD OF THE INVENTION

The invention relates to providing availability of one or more PCI Express™ lanes in the presence of one or more lane faults.

BACKGROUND OF THE INVENTION

The PCI Express™ interface protocol, as defined by the PCI Express Base Specification, Revision 1.0a (Apr. 15, 2003), is fast becoming a widely used standard across the computer industry for a high-speed data communication link. Currently, when two devices are interconnected with a multi-lane PCI Express™ link, all the lanes must work correctly for the entire link to work at all. If one or more lanes have a fault, the PCI Express™ Specification directs the devices to enter modes that prevent the entire link from working. The presence of a permanent failure on any of the lanes, such as a disconnected wire in a differential pair, leads to one of the two devices entering the Polling.Compliance state and prevents the link from working. In the Polling.Compliance state the entire link is supposed to transmit compliance patterns which are used to test the electrical eye diagram to see if the transmission circuitry is following the electrical specification. A common failure condition that leads to the transmission of the compliance patterns exists when one receiver lane of a differential pair is completely disconnected. In this case, the device detects a receiver since the receiver detection is performed on transmitter lanes. But the other (farther) device will not detect a receiver on the faulty lane and will not transmit any pattern on that lane and keep it electrically idle. Thus, even though the device detects a receiver on its faulty lane, it will not detect an exit from electrical idle on the faulty lane. Following the PCI-Express™ specification, all lanes of the device should transmit compliance patterns since the link training state machine will go to Polling.Compliance state. An undesirable side effect of this mechanism is that if a single wire of any differential pair is disconnected on the transmit side, the entire PCI Express™ link (including all lanes, not just the faulty lane) will be non-operational. This is a substantial hardware reliability and robustness issue because many end users want fault tolerance against one or more failures such as a single wire disconnect.

BRIEF DESCRIPTION OF THE DRAWINGS

The present invention is illustrated by way of example and is not limited by the figures of the accompanying drawings, in which like references indicate similar elements, and in which.

DETAILED DESCRIPTION OF THE INVENTION

Embodiments of a method, device, and system for providing high availability in a PCI Express™ link in the presence of lane faults are disclosed. In the following description, numerous specific details are set forth. However, it is understood that embodiments may be practiced without these specific details. In other instances, well-known elements, specifications, and protocols have not been discussed in detail in order to avoid obscuring the present invention.

Figure 1:
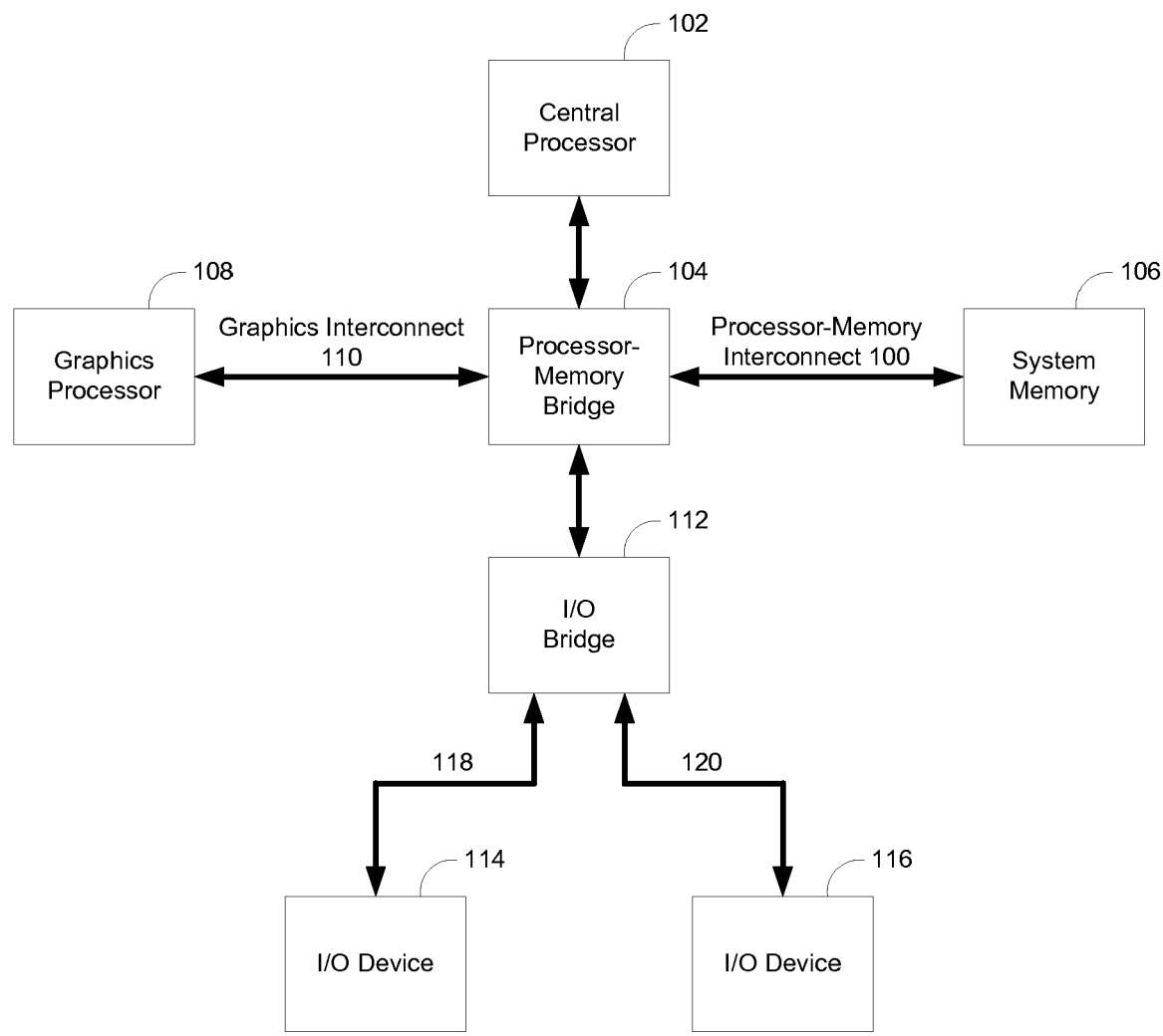
FIG. 1 is a block diagram of a computer system which may be used with embodiments of the present invention.

FIG. 1 is a block diagram of a computer system which may be used with embodiments of the present invention. The computer system comprises a processor-memory interconnect 100 for communication between different agents coupled to interconnect 100, such as processors, bridges, memory devices, etc. Processor-memory interconnect 100 includes specific interconnect lines that send arbitration, address, data, and control information (not shown). In one embodiment, central processor 102 is coupled to processor-memory interconnect 100 through processor-memory bridge 104. In another embodiment, there are multiple central processors coupled to processor-memory interconnect (multiple processors are not shown in this figure).

Processor-memory interconnect 100 provides the central processor 102 and other devices access to the memory subsystem. In one embodiment, a system memory controller that controls access to system memory 106 is located on the same chip as processor-memory bridge 104. In another embodiment, a system memory controller is located on the same chip as central processor 102. Information, instructions, and other data may be stored in system memory 106 for use by central processor 102 as well as many other potential devices. In one embodiment, a graphics processor 108 is coupled to processor-memory bridge 104 through a graphics interconnect 110.

In one embodiment, I/O devices 114 and 116 are coupled to system I/O interconnects 118 and 120 and to processor-memory interconnect 100 through I/O bridge 112 and processor-memory bridge 104. I/O Bridge 112 is coupled to processor-memory interconnect 100 (through processor-memory bridge 104) and system I/O interconnects 118 and 120 to provide an interface for an I/O device to communicate with a device on the processor-memory interconnect 100.

In one embodiment, the computer system in FIG. 1 implements one or more PCI Express™ interconnects. In one embodiment, I/O devices 114 and 116 are PCI Express™ endpoints. In another embodiment, graphics interconnect 110 is a PCI Express™ x16 interconnect. In many embodiments, there are multiple PCI Express™ interconnects between different devices as shown in FIG. 1. Any one of these interconnects shown may develop one or more points of failure due to faulty wires among other problems. For example, if one lane of a PCI Express™ x16 graphics interconnect fails, according to the PCI Express™ Base Specification, Revision 1.0a (Apr. 15, 2003), the entire interconnect will be non-operational. Thus, it is beneficial to integrate a failure circumvention technique to retain the functionality of one or more interconnect lanes that are still operational.

Figure 2:
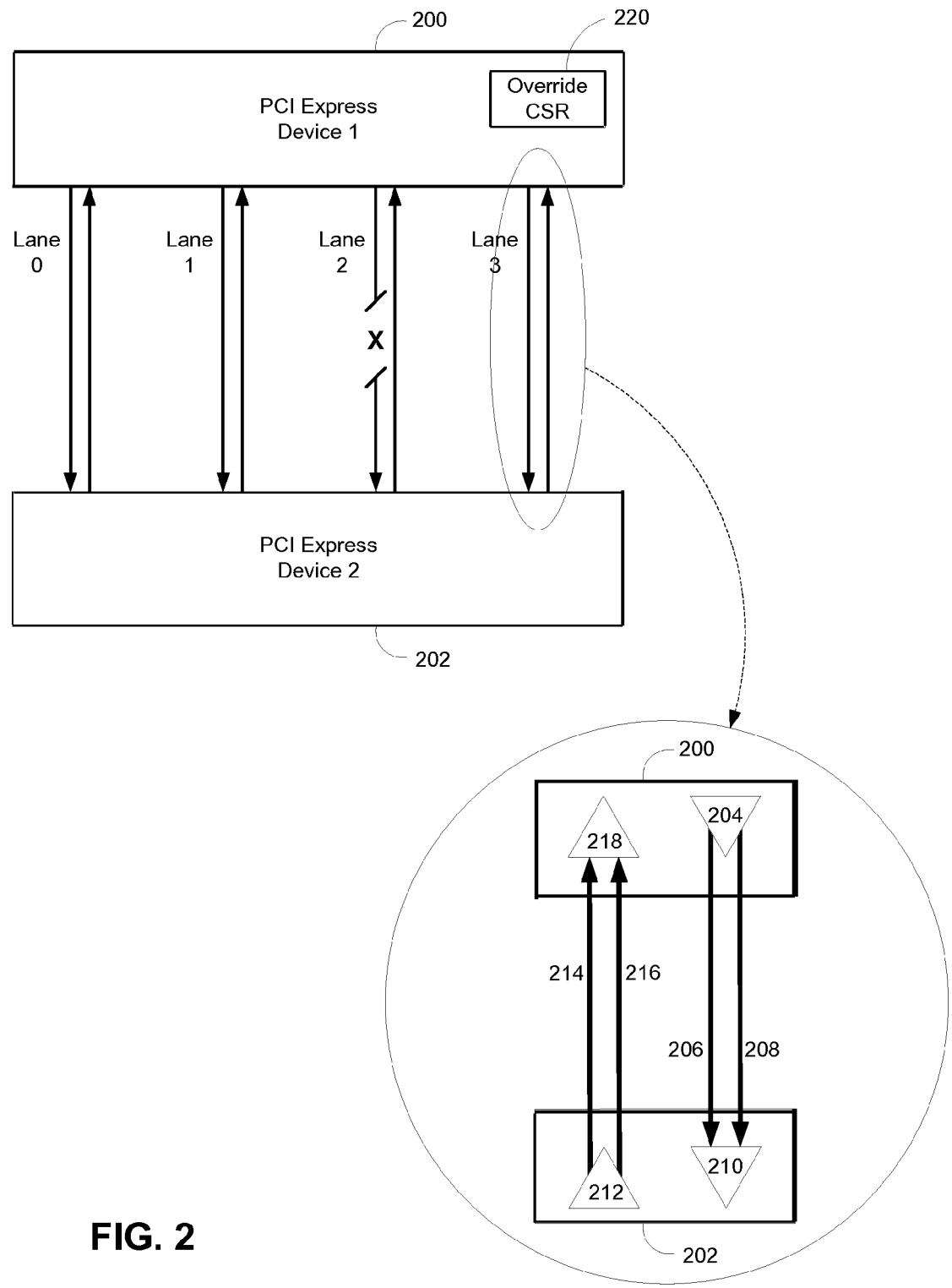
FIG. 2 is a block diagram of one embodiment of two PCI Express™ devices linked with a 4-lane interconnect.

FIG. 2 is a block diagram of one embodiment of two PCI Express™ devices linked with a 4-lane interconnect. In different embodiments, the two PCI Express™ devices, Device 1 (200) and Device 2 (202), could be any two devices in a computer system that are directly connected with a multi-lane PCI Express™ interconnect. In different embodiments, the PCI Express™ interconnect can be any number of lanes, greater than one, that comply with the PCI Express™ specification. In one embodiment, the PCI Express™ interconnect is a 4-lane link and each lane consists of four wires. Specifically, each lane in a PCI Express™ full-duplex (i.e. 2-way) differential serial interconnection between two devices requires four wires.

For example, FIG. 2 shows the specific wiring requirements for lane 3 in the larger dotted circle. Device 1 (200) has a transmitter 204 that sends data serially on two wires 206 and 208. The two wires comprise a differential signal pair. The first wire 206 sends the signal itself and the second wire 208 sends the inverse of the signal. Device 2 (202) has a receiver 210 that receives the signals from the differential signal pair (206 and 208) transmitted by device 1 (200). Additionally, a second differential signal pair comprising wires 214 and 216 is utilized to send signals from the device 2 (202) transmitter 212 to the device 1 (200) receiver 218. This set of four wires comprises one lane of a full-duplex differential serial link, of which there are four lanes in the present embodiment.

In the example embodiment in FIG. 2, lanes 0, 1, and 3 are intact and working correctly but lane 2 has a single point of failure in the wiring of lane 2. The point of failure in this example is the differential signal pair that transmits data from device 1 (200) to device 2 (202). The failure can occur when either one of the wires in the differential signal pair is compromised. In one embodiment, a link training and status state machine (LTSSM) integrated into device 1 (200). In one embodiment, the LTSSM operates normally in compliance with the PCI Express™ interface protocol, as defined by the PCI Express™ Base Specification. Additionally, in one embodiment, device 1 (200) also contains a special override hardware configuration register (Override CSR 220). When this register is cleared, device 1 (200) operates as it normally would in compliance with the specification mentioned above. When this register is set, device 1 (200) overrides certain standard PCI Express™ operating procedures that deal with one or more lane faults. In one embodiment, a specific bit in the register is designated as the override bit, which is checked during each stage of the PCI Express™ link negotiation process.

Figure 3:
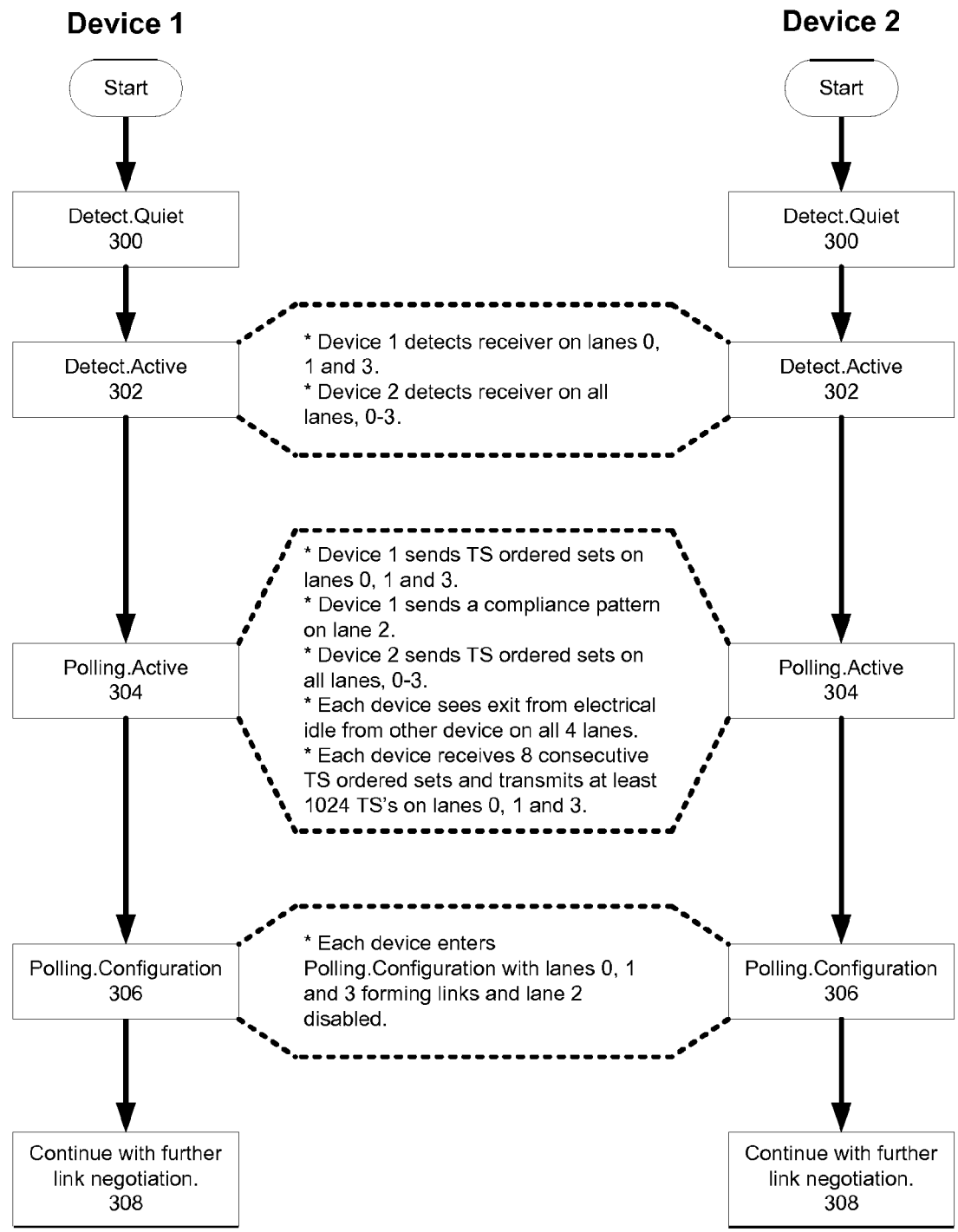
FIG. 3 is a flow diagram of one embodiment of a modified LTSSM failure circumvention process.

FIG. 3 is a flow diagram of one embodiment of a modified LTSSM failure circumvention process. The process is performed by processing logic that may comprise hardware (circuitry, dedicated logic, etc.), software (such as is run on a general purpose computer system or a dedicated machine), or a combination of both. In this embodiment, the processing logic, including the modified LTSSM, is located within device 1 (100 in FIG. 2). In the example embodiment in FIG. 3, a single point of failure is the lane 2 transmission differential pair from device 1 to device 2 (as shown by the broken link and the X in lane 2 in FIG. 2).

The failure circumvention process begins by both device 1 and device 2 entering Detect.Quiet state (300). Detect.Quiet is the state that the devices are in when the transmitters on both devices are all in an electrical idle state. The electrical idle state is defined in the PCI Express™ Base Specification (as cited above). Once 12 milliseconds have elapsed in Detect.Quiet or if an electrical idle is broken on any lane, each device enters Detect.Active state (302). In Detect.Active, each transmitter for each lane of each device performs a receiver detection sequence. The receiver detection sequence is defined in the PCI Express™ Base Specification (as cited above). In the example embodiment, device 1 detects a receiver on lanes 0, 1, and 3 only because lane 2 has a failure (as seen in FIG. 2). Device 2 detects a receiver on all four lanes (lanes 0-3).

In the example embodiment, both devices then enter the Polling.Active state (304). In Polling.Active device 1 sends training sequence (TS) ordered sets on lanes 0, 1, and 3 to device 2. The TS ordered sets are defined in the PCI Express™ Base Specification (as cited above). In the example embodiment, processing logic within device 1 checks to see if the Override CSR (FIG. 2, item 120) is set because it did not detect a receiver on lane 2. If the Override CSR is set, processing logic in device 1 does not send electrical idle on lane 2 as it otherwise would to comply with the PCI Express™ Base Specification. Rather, processing logic in device 1 instead sends some pattern such as a compliance pattern. This is done so that device 2 does not enter the Polling.Compliance state as it otherwise would in this scenario if it did not see an exit from electrical idle on all lanes (as outlined in the PCI Express™ Base Specification). Device 2 sends TS ordered sets on all four lanes to device 1. Thus, all four lanes transmitting from device 2 to device 1 exit from electrical idle and lanes 0, 1, and 3 transmitting from device 1 to device 2 exit from electrical idle with the transmission of the TS ordered sets. Furthermore, lane 2 transmitting from device 1 to device 2 also exits from electrical idle with the transmission of a compliance pattern sent by processing logic in device 1. However, because processing logic in device 1 only sends a compliance pattern on lane 2, instead of the required training sequence, lane 2 will eventually be left out of the link formation process. This allows the PCI Express™ link to operate in a degraded mode without the bad lane instead of being completely non-operational.

Returning to FIG. 3, since all lanes have exited from electrical idle that allows both device 1 and device 2 to enter the Polling.Configuration state (306) once each device receives 8 consecutive TS ordered sets and transmits at least 1024 TS's on lanes 0, 1, and 3. At this point the failure circumvention process completes and both devices continue with further link negotiation (308). In another embodiment, lane 2 sends the regular TS ordered sets as it normally would and allows device 2 to drop its faulty receiver lane 2 if the signal it receives in that lane does not give it good symbols for it to link train.

Figure 4:
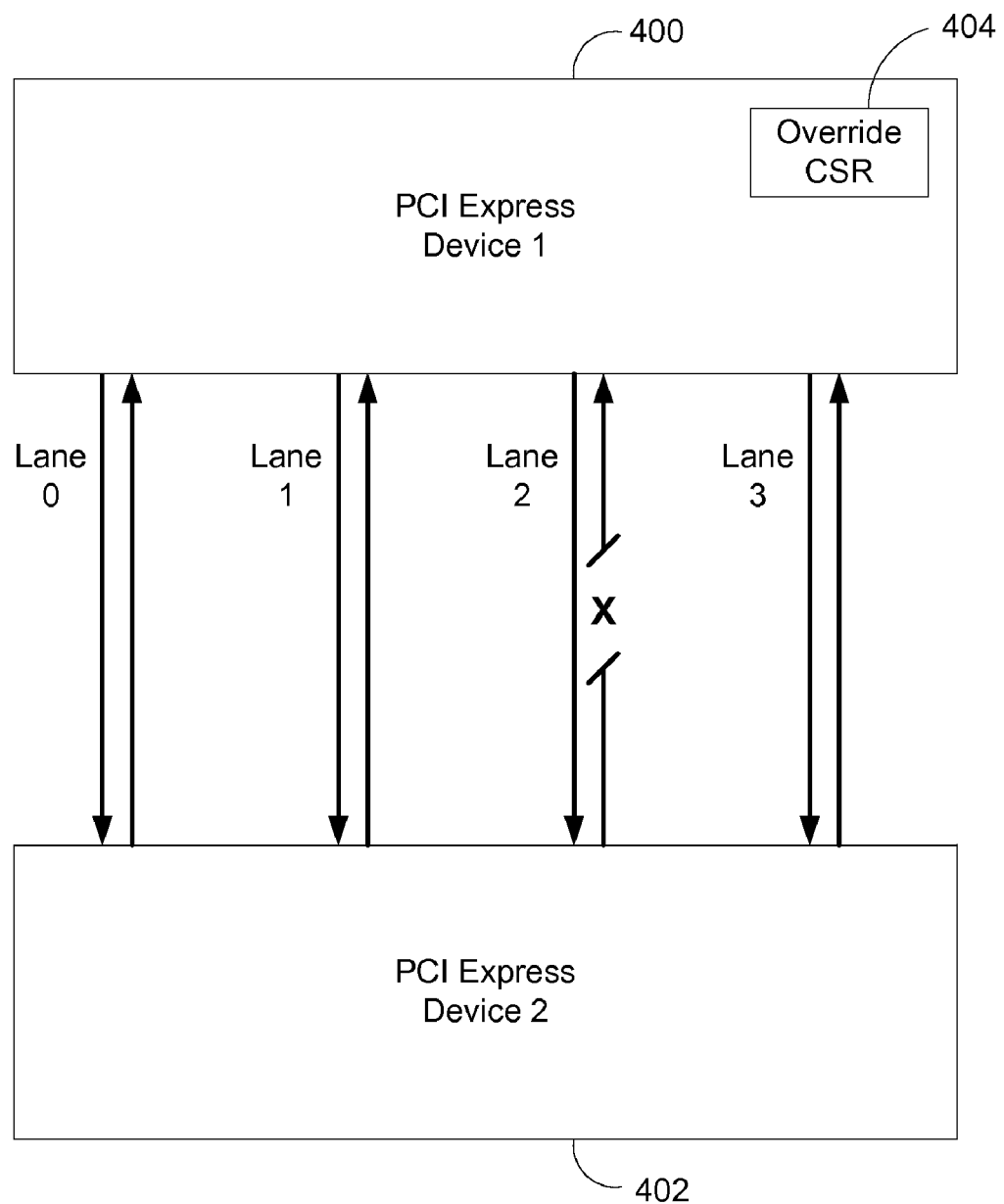
FIG. 4 is a block diagram of two PCI Express™ devices linked with a 4-lane interconnect in another embodiment.

FIG. 4 is a block diagram of two PCI Express™ devices linked with a 4-lane interconnect in another embodiment. In this example embodiment, a single point of failure exists in the device 2 (402) to device 1 (400) transmission differential pair. Again, in this embodiment as in the example embodiments described in FIGS. 2 and 3, the modified LTSSM is located in processing logic in device 1 (400) and the Override CSR is located in device 1 (404) as well.

Figure 5:
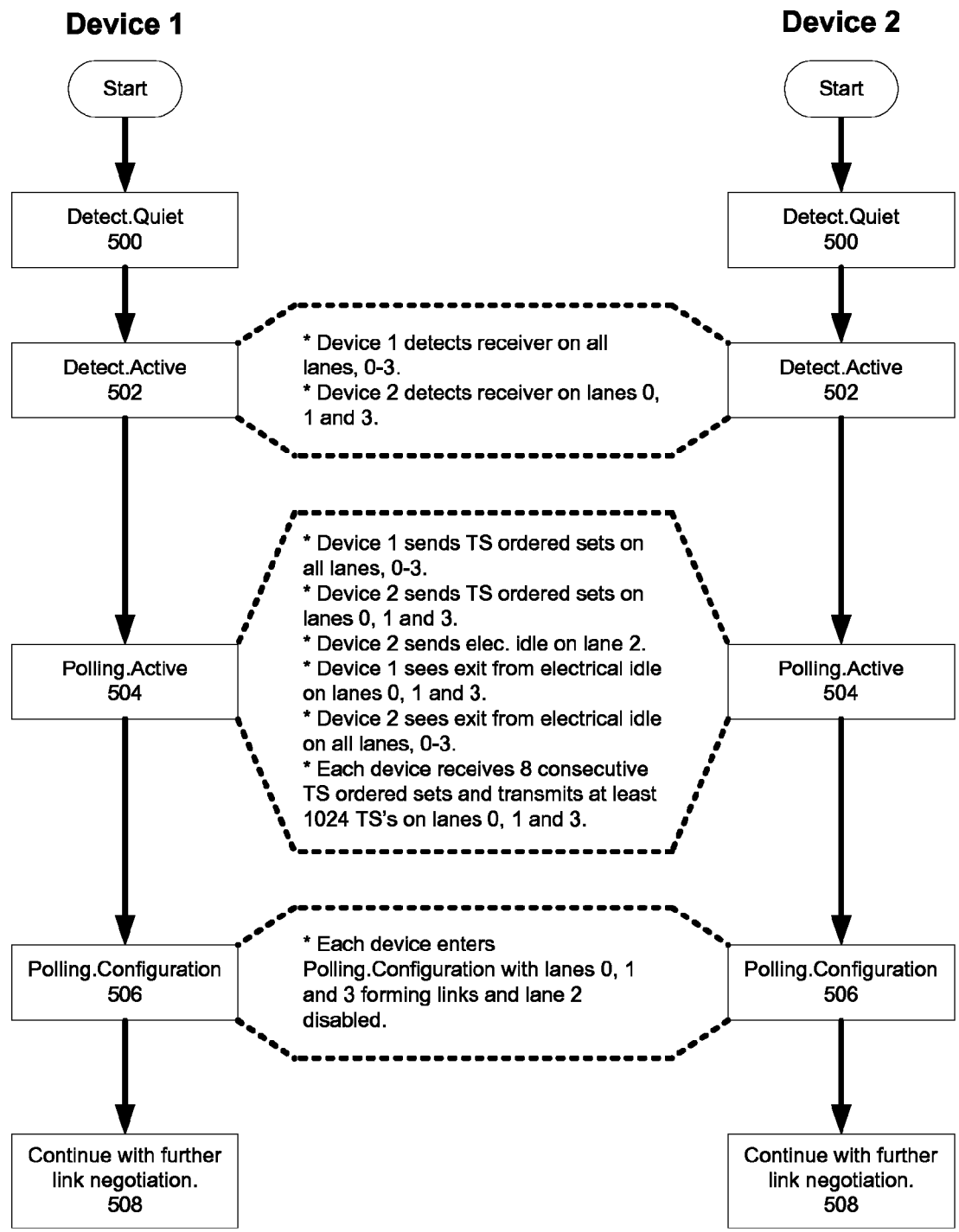
FIG. 5 is a flow diagram of another embodiment of a modified LTSSM failure circumvention process.

FIG. 5 is a flow diagram of another embodiment of a modified LTSSM failure circumvention process. The process is performed by processing logic that may comprise hardware (circuitry, dedicated logic, etc.), software (such as is run on a general purpose computer system or a dedicated machine), or a combination of both. In this embodiment, the processing logic, including the modified LTSSM, is located within device 1 (400 in FIG. 4). In the example embodiment in FIG. 5, a single point of failure is located in the device 2 to device 1 transmission differential pair in lane 2 (as shown by the broken link and the X in lane 2 in FIG. 4).

The failure circumvention process begins by both device 1 and device 2 entering the Detect.Quiet state (500). Once 12 milliseconds have elapsed in Detect.Quiet or if an electrical idle is broken on any lane, each device enters the Detect.Active state (502). In Detect.Active, each transmitter for each lane of each device performs a receiver detection sequence. In the current example embodiment, device 1 detects a receiver on all four lanes (lanes 0-3). Device 2 detects a receiver on lanes 0, 1, and 3 only because lane 2 has a single point of failure (as seen in FIG. 4).

In the example embodiment, both devices then enter the Polling.Active state (504). In Polling.Active, device 1 sends TS ordered sets on all four lanes to device 2. Device 2 sends TS ordered sets on lanes 0, 1, and 3 to device 1 and an electrical idle signal to device 1 on lane 2 (per PCI Express™ Base Specification requirements). In the current embodiment, processing logic in device 1 checks to see if the Override CSR (FIG. 4, item 404) is set. If the Override CSR is set, processing logic in device 1 will not enter the Polling.Compliance state even though there is no exit from electrical idle on lane 2. Rather, processing logic in device 1 instead continues the process of receiving 8 consecutive TS ordered sets and transmitting at least 1024 TS's on lanes 0, 1, and 3. Once this successfully occurs, processing logic in device 1 enters the Polling.Configuration state (506). Device 2 also enters the Polling.Configuration state (506) according to the PCI Express™ specification. Thus, both devices are able to enter Polling.Configuration and train to form a degraded link without the bad lane. At this point the failure circumvention process completes and both devices continue with further link negotiation (388).

In one embodiment, the Override CSR remains off during the device power-on process to be compliant with the PCI Express™ Base Specification. Thus, in this embodiment, if an end-user wants a PCI Express™ device to work in a degraded mode after a failure occurrence, the Override CSR is set after power-on through a CPU access or through a Joint Test Action Group (JTAG) interface or any other sideband mechanism. In this embodiment, if the device with the override capabilities is looping in Polling.Compliance mode due to the failure, the device moves directly to Polling.Active after the Override CSR is set even though it does not detect exit from electrical idle on all lanes. Therefore, when the CSR is set, the device not only exits out of Polling.Compliance mode, but it is not able to reenter Polling.Compliance mode at a later point in time. Additionally, when this CSR is set, the device sends a pattern (such as a compliance pattern) even in lanes it did not detect a receiver in an attempt to get the other device (the device on the other end of the link) out of Polling.Compliance. Thus, only one PCI Express™ device requires the CSR and circumvention logic to allow a degraded link to be formed between itself and another PCI Express™ device.

In different embodiments, the degraded mode that results from the failure override modification may be any number of lanes that comply with a valid PCI Express™ link in the specification.

Thus, embodiments of a method, device, and system for providing high availability in a PCI Express™ link in the presence of lane faults are disclosed. These embodiments have been described with reference to specific exemplary embodiments thereof. Though, the device, method, and system may be implemented with any given protocol with any number of layers. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A device, comprising:
a plurality of transmitters, each of the plurality of transmitters to originate a transmission of information on a lane of a two-way differential serial link, comprising multiple lanes, during normal operation of the link;
a plurality of receivers, each of the plurality of receivers to receive information from a lane of the link during normal operation of the link;
a failure discovery unit to detect failures at any location on the link; and
a link training unit to cause at least one lane of the link to be brought into an active state to continue the transmission of information if at least one lane of the link is still operational after a failure detection on the link.

2. The device of claim 1, wherein each lane of the link comprises at least two wires to transmit information and at least two other wires to receive information.

3. The device of claim 2, wherein the device is further operable to:
detect a transmitter from a second device coupled to the link in at least one but not all lanes of the link; and
operate the link in a degraded mode without use of the one or more lanes with no detected transmitter.

4. The device of claim 3, wherein detecting a transmitter further comprises detecting an exit from an electrical idle state from the transmitter.

5. The device of claim 2, wherein the device is further operable to:
detect a receiver from a second device coupled to the link in at least one but not all lanes of the link; and
operate the link in a degraded mode without use of the one or more lanes with no detected receiver.

6. The device of claim 5, wherein the device is further operable to:
enter a configuration state upon discovery of the failure;
transmit a training sequence in every lane of the link that a receiver was detected while in the configuration state; and
transmit a test pattern in the one or more lanes of the link that did not detect a receiver while in the configuration state.

7. A system, comprising:
a two-way differential serial link, comprising multiple lanes;
a first device coupled to the link; and
a second device coupled to the link, the second device to originate a transmission of information across the link to the first device;
detect a failure at any location on the link; and
cause at least one lane of the link to be brought into an active state to continue the transmission of information if at least one lane of the link is still operational after a failure detection on the link;
wherein the first device and second device each including a transmitter and receiver to transmit and receive information on each lane of the link during normal operation of the link, wherein each lane of the link comprises at least two wires to transmit information and at least two other wires to receive information.

8. The system of claim 7, wherein the second device is further operable to:
detect a transmitter from the first device in at least one but not all lanes of the link; and
operate the link in a degraded mode without use of the one or more lanes with no detected transmitter.

9. The system of claim 8, wherein detecting a transmitter further comprises detecting an exit from an electrical idle state from the transmitter.

10. The system of claim 7, wherein the second device is further operable to:
   detect a receiver from a first device in at least one but not all lanes of the link; and
   operate the link in a degraded mode without use of the one or more lanes with no detected receiver.

11. The system of claim 10, wherein the second device is further operable to:
   enter a configuration state upon discovery of the failure;
   transmit a training sequence in every lane of the link that a receiver was detected while in the configuration state; and
   transmit a test pattern in the one or more lanes of the link that did not detect a receiver while in the configuration state.

12. The system of claim 7, wherein the second device further comprises:
   a configuration register including a link failure override bit, the second device to cause the at least one lane of the link to be brought into an active state to continue the transmission of information when the link failure override bit has been set.

13. A method, comprising:
   discovering a failure at any location on a two-way differential serial links, comprising multiple lanes, wherein the link transmits and receives data on each lane when a failure has not been detected; and
   causing at least one lane of the link to be brought into an active state to allow the transmission of information if at least one lane of the link is still operational after a failure detection on the link.

14. The method of claim 13, wherein the link couples a first device and a second device together to allow the transmission of information to originate from the first device targeting the second device and to originate from the second device targeting the first device.

15. The method of claim 14, wherein the first device and second device each including a transmitter and receiver to transmit and receive information on each lane of the link, and wherein each lane of the link comprises at least two wires to transmit information and at least two other wires to receive information.

16. The method of claim 15, further comprising:
   detecting a transmitter from the first device in at least one but not all lanes of the link; and
   operating the link in a degraded mode without use of the one or more lanes with no detected transmitter.

17. The method of claim 15, further comprising:
   detecting a receiver from the first device in at least one but not all lanes of the link; and
   operating the link in a degraded mode without use of the one or more lanes with no detected receiver.

18. The method of claim 17, further comprising:
   entering a configuration state when the link failure is discovered; and
   transmitting a training sequence in every lane of the link that a receiver was detected while in the configuration state; and
   transmitting a test pattern in the one or more lanes of the link that did not detect a receiver while in the configuration state.

19. The method of claim 17, further comprising:
   entering a configuration state when the link failure is discovered; and
   transmitting a training sequence of information across all lanes of the link upon entering the configuration state.

* * * * *